United States Patent [19]

Pillifant, Jr.

[11] Patent Number: 4,889,380
[45] Date of Patent: Dec. 26, 1989

[54] SCREEN PRINTED CLAMP-ON AUTOMOTIVE SUN-FILTER ASSEMBLY

[76] Inventor: Albert Pillifant, Jr., 1406 E. Pine St., Midland, Mich. 48640

[21] Appl. No.: 191,700

[22] Filed: Sep. 26, 1988

[51] Int. Cl.$^4$ ............................................. B60J 3/02
[52] U.S. Cl. ..................................... 296/97.6; 40/658
[58] Field of Search ................... 296/97.1, 97.5, 97.6; 40/591, 593, 611, 658, 666

[56] References Cited

U.S. PATENT DOCUMENTS

| | | | |
|---|---|---|---|
| 2,690,928 | 10/1954 | Boynes | 40/658 X |
| 4,270,292 | 6/1981 | Eckberg, II | 40/611 |
| 4,352,519 | 10/1982 | Aro | 296/97.6 |
| 4,635,995 | 1/1987 | Mineck | 296/97.6 |

FOREIGN PATENT DOCUMENTS 0014516  1/1984  Japan .................................. 296/97.5

Primary Examiner—Dennis H. Pedder
Assistant Examiner—Gary C. Hoge
Attorney, Agent, or Firm—Timothy S. Stevens; Edward E. Schilling

[57] ABSTRACT

A clamp-on automotive sun-filter assembly having an injection molded opaque indicia-bearing clamping panel and integrally formed spring clamps for attachment to a conventional automotive sun visor, and a tinted sun filter panel hinged to and swung below an edge of the clamping panel, is improved by filling in the die clearance apertures of the clamping panel with inserts to provide an uninterrupted printing surface.

5 Claims, 2 Drawing Sheets

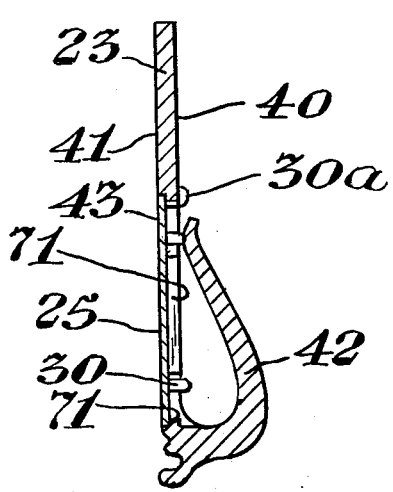
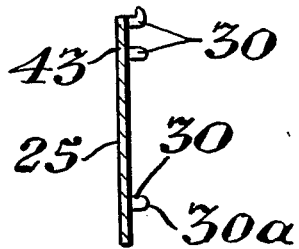
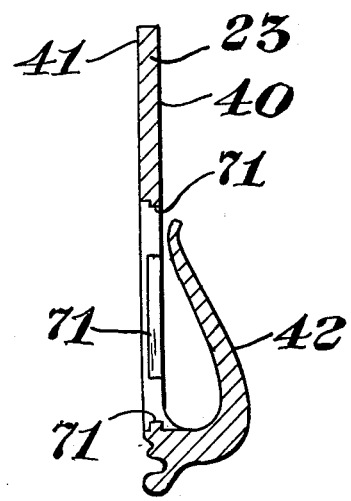
Fig. 3　　Fig. 4a　　Fig. 4
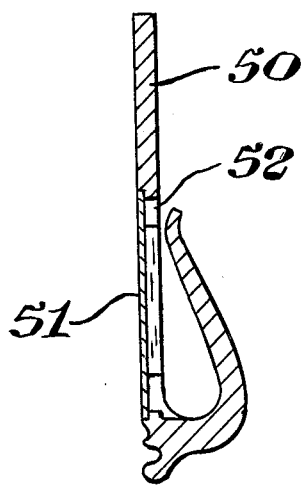
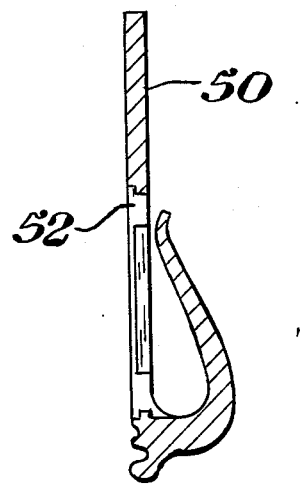
Fig. 5　　Fig. 6a　　Fig. 6
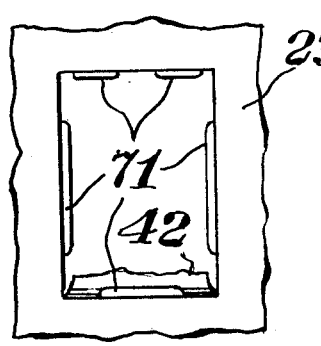
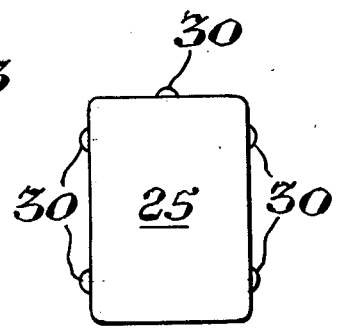
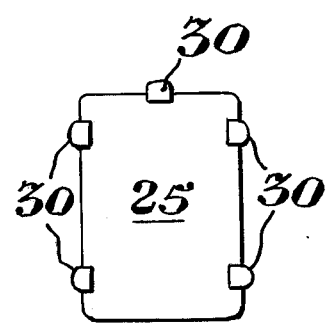
Fig. 7　　Fig. 8　　Fig. 9

SCREEN PRINTED CLAMP-ON AUTOMOTIVE SUN-FILTER ASSEMBLY

FIELD OF THE INVENTION

The invention is in the field of clamp-on automotive sun-filter assemblies of the type having advertisements or other indicia screen printed on the clamping panel thereof.

BACKGROUND OF THE INVENTION

Driving an automobile towards the sun when the sun is low in the sky is annoying because of the intense direct light. All automobiles have opaque sun-visors that can be swung down to block some of this light. Automotive aftermarket sun-filter assemblies are available that clamp onto an opaque sun-visor so that a see-through light-filtering panel can be swung down below the opaque sun-visor. The sun-filter is an advance over the opaque sun-visor because it can be seen through and yet can reduce the light intensity and it extends down further from the visor when the visor is in its operative position. Most such sun-filter assemblies have a see-through light-filtering panel hinged to attachment means consisting of an opaque clamping panel having extending therefrom one or more molded plastic clamps by which the assembly is adapted to be clamped to a conventional opaque sun-visor, the attachment means preferably engaging the sun visor with the springy clamps on the windshield side of the visor and the flat opaque panel on the opposite face of the visor. Most such attachments means have a pair of cantilevered spring-clamps integrally molded at one end thereof with an edge of the body of the opaque panel and aligned with juxtaposed die clearance apertures through the panel to facilitate integrally molding the spring-clamps with the panel.

Recently, such clamping panels have been made with oversize flat bodies which are screen printed with advertisements so that the advertisements are exposed to view and thus visible when the sun-filter assembly is in use. However, it is a problem to screen print such a clamping panel because of the die clearance apertures usually in the middle of the printed field, i.e., screen printing is best done on a smooth, flat, continuous surface not having any openings therethrough to interrupt a display.

SUMMARY OF THE INVENTION

The present invention is a solution to the above-mentioned screen printing problem for such a clamp-on automotive sun-filter assemblies. The improvement comprises positioning and retaining a close, flat, flush fitting insert in each die clearance aperture so that there is a substantially continuous surface upon which to screen print indicia.

BRIEF DESCRIPTION OF THE DRAWINGS

FIG. 3 is a sectional view of the attachment means of FIG. 2 taken along the lines 3—3 of FIG. 2 showing one of the inserts of FIG. 2 positioned in a die clearance aperture, the hooks of the insert retaining the insert in the aperture;

FIGS. 4 and 4a are respective sectional views of the clamping panel and an insert of FIG. 2 taken as in FIG. 3 but with the insert of FIG. 4a having been removed to better show the hooks used to attach the insert to the periphery of the die clearance aperture;

FIG. 5 is a sectional view of a clamping panel and insert similar to that of FIG. 2 showing an alternative form of insert positioned in the die clearance aperture and retained therein by an adhesive;

FIGS. 6 and 6a are sectional views similar to FIGS. 4 and 4a, respectively, showing an alternative embodiment of the simple planar insert of FIG. 5 removed from the die clearance aperture;

FIG. 7 is a fragmentary view of one of the die clearance aperture regions of the clamping panel of FIG. 2 with the insert removed, showing the integrally molded ledges around the periphery of the aperture which index and position the insert depth in the aperture so that the top surface can be set precisely flush with the surface of the clamping panel;

FIG. 8 is a top view of one of the inserts as shown in FIG. 4a showing the lateral extent of the hooks; and FIG. 9 is a bottom view of the insert of FIG. 4a, further illustrating disposition of the retaining hooks in a suitable array.

DETALED DESCRIPTION OF THE INVENTION

Figure 1:
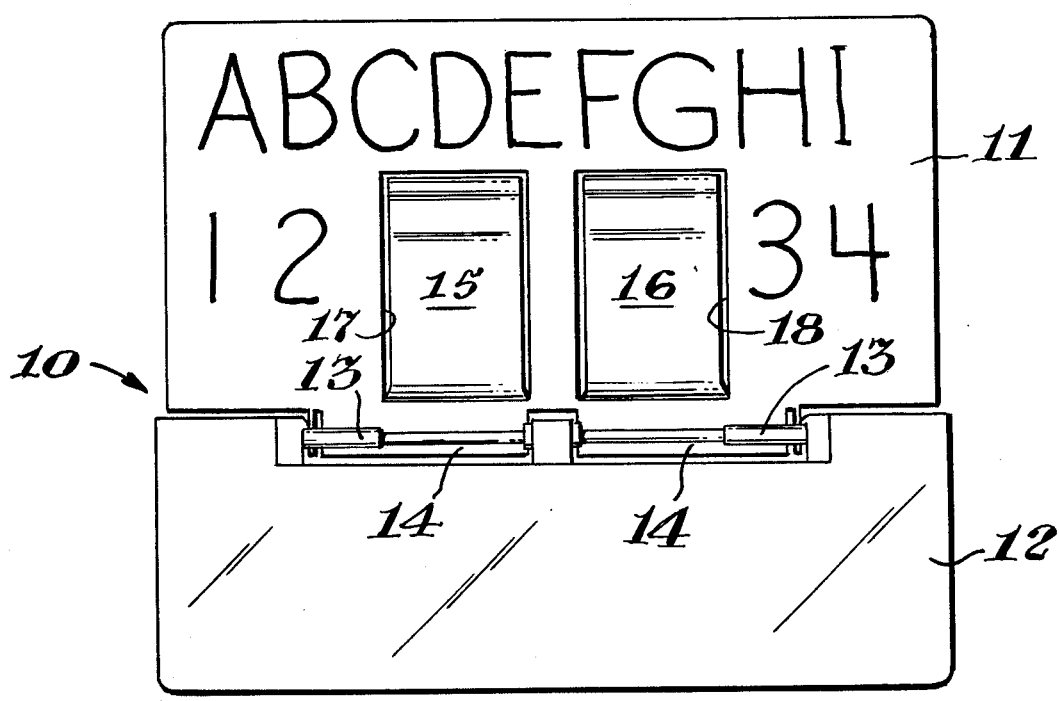
FIG. 1 is a front view of a prior art clamp-on automotive sun-filter assembly showing a pair of die clearance apertures in the clamping panel portion of the attachment means of the assembly and indicia screen printed on the clamping panel around the die clearance apertures; and a see-through light-filtering panel hingeably attached to and extending below the clamping panel.

Referring now to FIG. 1, therein is shown a prior art clamp-on automotive sun-filter assembly indicated generally by the numeral 10. The assembly 10 is made-up of attachment means, here shown to hold the assembly to a conventional opaque sun visor in the extended operative position, the attachment means consisting in part of an opaque molded plastic clamping panel or body 11; and a molded plastic see-through light-filtering panel 12. The filter panel 12 is hinged to the opaque panel 11 by way of hinge pins 13 which are pressed into and pivotally retained by slotted clips 14. The opaque panel 11 together with a pair of spring-clamps 15 and 16 which are each integrally molded at one end thereof with an edge of the opaque panel 11 serve as attachment means for clamping the assembly onto a standard opaque sun-visor. The panel 11 has a pair of die-clearance apertures 17 and 18 to facilitate the integral molding of the spring-clamps 15 and 16 with the body or panel 11. The panel 11 is shown having a substantially flat surface upon which is printed the indicia ABCDEFGHI and 1234 which are simply symbols here of printing or graphics which can be displayed. It is a problem to print this indicia around the apertures 17 and 18 because the printing screen is unsupported over the aperatures 17 and 18 during the printing process and, further, the message of the indicia is lost in about the center of the clamping panel.

Figure 2:
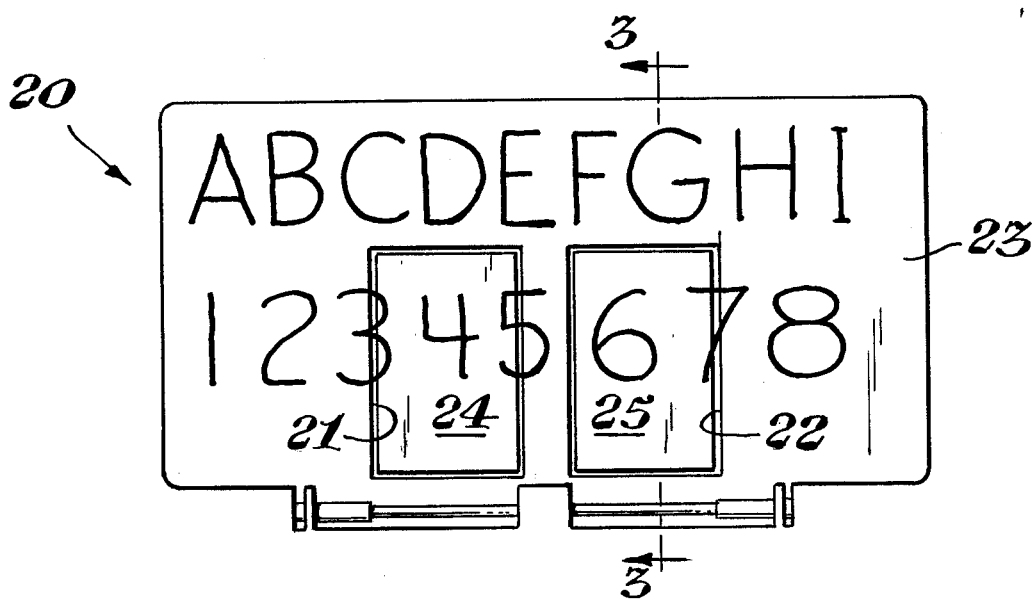
FIG. 2 is a front view of the present novel attachment means for a clamp-on automotive sun-filter assembly as in FIG. 1 with the sun filter panel removed showing substantially flat-surface, close fitting inserts positioned in the die clearance apertures of the clamping panel of the attachment means providing a substantially uninterrupted surface for screen printing the indicia shown thereon.

In FIG. 2 is shown a front view of a clamp-on automotive sun-filter assembly 20 of the present invention but with the filter panel as in FIG. 1 removed for purposes of illustration. The opaque panel 23 of the assembly 20 is similar to that shown in the assembly 10 in most respects including a pair of die clearance apertures 21 and 22 in the panel 23. Critically, however, the assembly 20 includes a pair of substantially planar inserts 24 and 25 positioned in the die clearance apertures 21 and 22. The inserts 24 and 25 closely fit the shape and have the transfacial dimensions of the apertures 21 and 22. The inserts each have a substantially flat face shown positioned substantially closed coplanar with the face shown of the panel 23 providing a substantially uninterrupted surface for screen printing thereon the indicia ABCDEFGHI and 12345678 shown or any other indicia or graphics desired.

Referring now to FIGS. 3, 4 and 4a, therein is shown a sectional view of the panel 23 of FIG. 2 as well as the insert 25 of FIG. 2. The panel 23 has a first face 40 and a second opposing face 41, and a cantilevered spring-clamp 42 integrally molded at one end thereof with the panel 23 and extending laterally from the first face 40 of the panel 23. The insert 25 is preferably made by the injection molding process and is shown having peripheral protuberances in the form of dogs or hooks 30 integrally molded with the insert 25 so that the insert 25 can be snapped into position as shown in FIG. 3 with the hooks 30 grasping the first face 40 of the panel 23. The hooks 30 have foreshortened shanks just long enough to extend the hooks past and over the adjacent panel surface 40, while the insert 25 is resting upon a plurality of ledges or steps 71 formed on the periphery of each die clearance aperture at an appropriate depth within the aperature to support the insert with surface 43 of the insert 25 closely flush and coplanar with the surface 41 of the panel 23. In FIG. 3, each hook 30 is shown having a rounded portion 30a that projects laterally of the first face 40 of the panel 23, i.e., the exposed surface of each hook as it extends over the face 40 is preferably rounded and smooth. These hook portions 30a are preferred and help retain the clamping panel 23 on an automotive sun visor. A suitable arrangement of integrally molded ledges 71 and cooperating hooks 30 is shown in FIGS. 7, 8 and 9.

In FIGS. 5, 6 and 6a there is shown a sectional view of an opaque panel 50 similar to the panel 23 of FIG. 2 and an alternative form of insert 51 which is retained in the aperture 52 by an adhesive, such as by a glue, not shown.

Among the advantages of the present improved assembly with inserts filling the die clearance apertures is the generally improved grip of the opaque panel and springy clamp combination on the sun visor as the visor with the insert for support does not deform into the die clearance aperture but is more firmly held between the clamp and the opaque panel. It should be understood that for the purposes of the present invention the term "automotive" includes cars, vans, buses and trucks. Wherein hooks are used to retain the inserts, it is preferred to have the hooks extend through notches or clefts or other interruptions between portions of the ledges.

What is claimed is

1. In a clamp-on automotive sun-filter assembly comprising a see-through light-filtering panel and a molded plastic clamping panel, the panels having substantially aligned edges and a hinge connecting such edges, the clamping panel having first and second opposed faces, at least one cantilevered spring-clamp integrally molded at one end thereof with the clamping panel and extending laterally from the first face of the clamping panel, the clamping panel having for each said at least one spring-clamp a die clearance aperture formed therethrough from the first face to the second face of the clamping panel juxtaposed each said at least one spring-clamp to facilitate integrally molding the spring-clamp with the clamping panel, the second face of the clamping panel being substantially smooth and planar so that indicia can be screen printed thereon, the clamping panel being adapted to be clamped to an automotive sun-visor by means of said at least one spring clamp in combination with the clamping panel and the see-through, light-filtering panel being pivotable about the hinge to be swung below the sun-visor when the sun is low in the sky to better allow an automobile front seat occupant to see when the automobile faces toward the sun and to present the screen printed indicia to the view of the occupant, wherein the improvement comprises:

a substantially planar insert positioned in each die clearance aperture closely fitting the perimeter shape thereof, having the perimeter dimensions of the aperture, the perimeter of each die clearance aperture being formed with inwardly extending ledge portions substantially parallel to and spaced apart from the printable said second face so as to support a said insert in the aperture with the surface of the insert coplanar with the second face, and means engaging said first face for retaining the insert in each such die clearance aperture, each insert having as the coplanar surface a smooth substantially flat face and each insert together with the second face therearound providing a substantially uninterrupted surface for ready screen printing of indicia thereon.

2. The assembly of claim 1 wherein the insert is formed of injected molded plastic.

3. The assembly of claim 1 having indicia printed thereon extending along the said second face and across at least one coplanar insert positioned in a die clearance aperture.

4. In a clamp-on automotive sun-filter assembly comprising a see-through light-filtering panel and a molded plastic clamping panel, the panels having substantially aligned edges and a hinge connecting such edges, the clamping panel having first and second opposed faces, at least one cantilevered spring-clamp integrally molded at one end thereof with the clamping panel and extending laterally from the first face of the clamping panel, the clamping panel having for each said at least one spring-clamp a die clearance aperture formed therethrough from the first face to the second face of the clamping panel juxtaposed each said at least one spring-clamp to facilitate molding the spring-clamp with the clamping panel, the second face of the clamping panel being substantially smooth and planar so that indicia can be screen printed thereon, the clamping panel being adapted to be clamped to an automotive sun-visor by means of said at least one spring clamp in combination with the clamping panel and the see-through, light-filtering panel being pivotable about the hinge to be swung below the sun-visor when the sun is low in the sky to better allow an automobile front seat occupant to see when the automobile faces toward the sun and to present the screen printed indicia to the view of the occupant, wherein the improvement comprises:

a substantially planar injection molded plastic insert positioned in each die clearance aperture closely fitting the perimeter shape thereof, having the perimeter dimensions of the aperture, each insert having a smooth substantially flat printable face and a not normally printed back face, the back face facing a spring clamp aligned therewith, the perimeter of each die clearance aperture being formed with inwardly extending ledge portions substantially parallel to and spaced apart from the printable second face so as to support a said insert in the aperture with the smooth flat face of the insert coplanar with the second face, and means for retaining the insert in each such die clearance aperture, the means for retaining including, in combination, said inwardly extending ledge portions and at least one hook integrally molded with the insert upon the not normally printed back face adjacent and extending slightly laterally from a perimeter edge thereof and also extending laterally past the perimeter of the die clearance aperture so as to overlay and grasp a portion of the first face of the clamping panel surrounding the die clearance aperture, and each insert together with the second face therearound providing a substantially uninterrupted surface for ready screen printing of indicia thereon.

5. The assembly of claim 4 wherein each hook has a rounded portion that projects laterally of the first face of the clamping panel.

* * * * *